United States Patent [19]

Fink

[11] Patent Number: 4,920,840

[45] Date of Patent: May 1, 1990

[54] APPARATUS FOR TRIMMING FABRIC COVERED ARTICLES

[76] Inventor: Richard Fink, 210 Oliver Way, Merrick, N.Y. 11516

[21] Appl. No.: 334,820

[22] Filed: Apr. 10, 1989

Related U.S. Application Data

[63] Continuation of Ser. No. 125,239, Nov. 25, 1987, abandoned, which is a continuation-in-part of Ser. No. 113,224, Oct. 28, 1987, Pat. No. 4,793,881.

[51] Int. Cl.$^5$ .............................................. B26D 7/01
[52] U.S. Cl. ...................................... 83/140; 83/143; 156/267
[58] Field of Search .................. 83/140, 686, 697, 143; 156/212, 213, 245, 267, 291, 292, 303.1, 381, 382, 383, 475, 486, 488-491, 514, 305, 380.7; 264/258, 283, 265, 134, 247, 248; 425/514, 302.1, 520, 521, 394, 398, 298; 24/163 FC, 31 R, 307; 53/441, 129, 130

[56] References Cited

U.S. PATENT DOCUMENTS

| 1,941,016 | 12/1933 | Mayle | 83/140 |
| 2,371,565 | 3/1945 | Whistler | 83/140 |
| 2,631,646 | 3/1953 | Gannon | 153/380.7 |
| 3,181,405 | 5/1965 | Coy | 83/140 |

*Primary Examiner*—Merrell C. Cashion, Jr.
*Attorney, Agent, or Firm*—Levisohn, Lerner & Berger

[57] ABSTRACT

A method of manufacturing a fabric-covered article, preferably a belt buckle, and a method for trimming the excess fabric and backing sheet material from a fabric-covered article. Apparatus for manufacturing the fabric-covered article, preferably a belt buckle and for trimming the excess fabric material after the fabric has been glued to the backing sheet, with a buckle-shaped insert sandwiched therebetween.

3 Claims, 5 Drawing Sheets

APPARATUS FOR TRIMMING FABRIC COVERED ARTICLES

RELATED APPLICATIONS

This application is a file wrapper continuation application of Ser. No. 07/125,239 filed Nov. 25, 1987, now abandoned, which itself is a continuation-in-part application of U.S. Application Ser. No. 113,224, filed Oct. 23, 1987, now U.S. Pat. No. 4,793,881.

BACKGROUND OF THE INVENTIONS

The present inventions relate to the field of manufacturing fabric-covered articles and, preferably, the manufacture of fabric-covered belt buckles. Basically, the inventions disclosed herein relate to a method and invention for first forming the fabric-covered belt buckle by gluing a buckle insert, in the shape of the belt buckle, between layers of a buckle backing sheet and fabric. This is done in an extremely quick, efficient and highly inexpensive manner and, yet, provides the finished product with a look and feel of a much more expensive, hand-stitched belt buckle. Also, the present invention relates to a trimming apparatus which takes the fabric-covered belt buckle insert, sandwiched by being glued between a layer of fabric and a backing sheet, and trims the excess backing sheet and fabric from around the outside edge of the belt buckle and from within the central aperture of the belt buckle to produce a finished product which is extremely aesthetically pleasing, yet, as previously mentioned, inexpensively and quickly produced. The inventions disclosed herein have particular applicability to the garment industry, fabric covered articles, for example, including costume jewelry, accessories, but with particular relevance to providing fabric-covered belt buckles. These belt buckles are then used in connection with matching or contrasting fabric belts to produce visually pleasing, expensive-looking, yet inexpensively made fabric-covered belts.

DESCRIPTION OF THE PRIOR ART

Fabric-covered belt buckles have been in existence for years. A machine covered buckle is currently available and is manufactured by first covering, by hand, a female or outer member of the belt buckle with fabric. This process step requires selective cutting, at the corners of the material to produce a smooth edge and then tucking in the excess material towards the interior of the female, outer belt buckle shape. With the buckle exterior, the female part, now covered with fabric and the excess material turned inwardly against the rear surface of the outer member, a male counterpart is press fitted into the female part to produce a fabric-covered belt buckle. This process, however, suffers from many disadvantages among them being that the procedure is extremely time and labor intensive. In addition, the cutting of the fabric corners, for turning inwardly the fabric for example, at the belt buckle central aperture, produces fabric waste when too much of the buckle is trimmed away (prior to the insertion of the male metal part) and the process must be started over with new fabric. In addition, the metal male and female members, which are press fit together to form the fabric-covered belt buckle, are relatively expensive. Furthermore, the rear of the fabric-covered belt buckle produced according to the machine covered method and apparatus is not covered with fabric nor a cover or backing sheet but, rather, is bare metal and, this, is unsightly, especially when the belt buckle is sought to be used and sold in connection with an expensive fabric belt.

In contrast to the male and female die stamped parts of a machine covered buckle, the present invention is inexpensive especially with respect to changing belt buckle design shapes. If a new buckle shape is desired, the present invention merely requires blocks of wood and associated metal cutting strips all readily available to be assembled, as desired. If a new shape is desired in the machine-made belt buckle, new dies must be obtained, requiring metal shop work and a corresponding closing die to be obtained. This is time consuming, labor intensive, and costly. In addition, the insert which is used in connection with the fabric-covered buckle of the present invention, sandwiched between fabric and backing sheet, can be easily cut out or extruded from plastic or, where the insert is the conventional and readily available cardboard with metal cover type, the shape can be easily cut out again, with wood and an inserted metal blade cutter. Thus, the tooling costs for the present invention are far less than required by the male and female die cut or stamped out parts, when buckle shape is desirably changed.

Another conventionally available method for producing a fabric-covered buckle is the hand-turned and stitched method. According to this method for producing a fabric-covered buckle, a buckle-shaped insert is located between a thick, cardboard-like backing layer and the fabric. The buckle is then handstitched around the outside edge and, after stitching, the excess material is hand cut and removed. This method of producing fabric-covered buckles is extremely labor intensive and, in addition, is more material intensive than the present invention in that the stitching necessarily passes through a thick support layer and, this thick support layer is more expensive than mere backing sheet material which is used in the present invention. In addition, the hand-turned and stitched method of manufacture produces variations from buckle to buckle since the individual who stitches the buckle, even when done on a machine, manually turns the buckle about the sewing needle and, therefore, the stitching often deviates away from the precise edge of the buckle. Thus, there are wide variations from buckle to buckle which is undesirable in promoting sales of the fabric-covered buckles to manufacturers who desire uniformity of product.

Also, with respect to hand-turned and stitched fabric-covered buckles, the cost for producing each such buckle is prohibitive in that it is so labor and material intensive. Therefore, this method cannot be economically adopted for inexpensive fabric-covered belts. For example, an imitation leather or vinyl covered belt, if hand-turned and stitched would require for resale at a profit a retail price far in excess to that which a consumer would be willing to pay for an imitation leather or vinyl belt. While hand-turning and stitching is desirable for expensive belt buckles and, in many cases justifies the cost of the expensive belts, consumers are really not willing to pay for hand-turned and stitched belt buckles where the fabric used and the ultimate belt is considered relatively inexpensive.

Thus, it is apparent that there is a definite need for a fabric-covered belt buckle which can, nevertheless, be produced at low cost and, yet, provide a handstitched appearance in that the rear has a backing layer, in contrast to the machine stamped, die cut belt buckles having a bare metal back. Furthermore, there is a need for buckle to buckle uniformity of quality in mass-produced belt buckles.

Also, in lieu of using the metal covered cardboard insert as the belt buckle insert, it is desirable to use a semi-rigid plastic molded insert having a "memory". This allows the belt buckle during manufacture to "give" while allowing the insert to return to its original shape after processing. Also, the plastic mold insert allows the finished product to be washed while a cardboard-metal insert, upon washing, deteriorates. The metal covered cardboard inserts, if slightly deformed during manufacture will retain the undesired deformed shape, i.e., the metal covered cardboard insert, if it is bent during the manufacturing process, will not spring back to its original shape but, rather, will retain the dent and always show a defect.

Another problem inherent in prior art fabric-covered belt buckle methods of manufacture is that by seeking to glue the fabric to the backing sheet simultaneously around the exterior edge of the belt buckle and the inside edge of the aperture of the belt buckle, the fabric and backing layer are pulled in two opposite directions. This results in poor adhesion between the fabric and the belt buckle and an unsightly finished article. Thus, according to the present invention, more fully explained hereinafter, the fabric is first adhered to the backing sheet around the inside edge of the aperture of the belt buckle (with the insert therebetween) and, then, after the glue starts to adhere between the fabric and the backing sheet, the exterior edge of the belt buckle fabric is glued to the backing sheet. Then, with both beads of glue being set, uniform pressure is applied to the fabric such that the fabric and the backing sheet are adhered together, as desired. This allows for the fabric to be first pulled inwardly towards the aperture of the belt buckle for adherence to the backing sheet around the edge of the aperture and then, after the initial adhesion, the fabric is pulled outwardly with respect to the aperture and down towards the backing sheet for the second adhesive operation around the outside edge of the belt buckle. This results in a finished product of exceptional appearance. Superior adhesion between fabric to backing sheet, along both edges, is accomplished.

In partial conclusion, therefore, the present invention provides a handmade looking belt buckle. Having the back of the belt buckle covered with a layer of material, all for low cost. Product variations are minimized from belt buckle to belt buckle. In addition, the present invention contemplates that the back of the buckle, while it is covered, is covered with a backing sheet of significantly less expense than the fabric covering used for the back of the belt buckle of a hand-turned and stitched process. This, again, is a clear economical advantage, yet, provides a more finished look to a belt buckle than if it were made according to the male and female die-stamped metal method of manufacture.

The prior art also contemplates the use of heat-sealing products for producing fabric-covered buckles. Heatsealing involves expensive, inflexible tooling and works only with materials possessing certain chemical properties. Further, the heatsealing method of belt buckle manufacturing is notorious for down time and material spoilage. The present invention, on the other hand, requires no special materials and will work equally well with plastic or vinyl fabric or films, supported or unsupported goods, genuine leather, suede, bonded leather, fake fur, fake suede and many other kinds of cloth. Furthermore, heatsealing products require a heat source for curing the adhesive which is relatively expensive. The present invention eliminates the need for a source of heat.

Tooling costs to manufacture a new shape of covered belt buckle according to the metal stamping method of manufacture can take months and thousands of dollars. This is due to the necessity of obtaining new male and female metal stamped parts which are not ordinarily available. It is also necessary for the manufacturer's machinery to have a closing die to facilitate insertion of the male member into the female member while maintaining the fabric over the female portion of the belt buckle. That, too, if the new shape is unavailable, is expensive and requires a sufficient period of time to produce a new closing die. Clearly, when it is desired to change styles, sometimes overnight, the use of these male and female metal dies and a corresponding closing die is expensive and results in sufficient down time awaiting the parts. The present invention, on the other hand, contemplates the use of a plastic buckle insert which can be punched or injection molded, in a short time span, from ordinarily available materials. The buckle assembling apparatus is simple and cheaply made from wood blocks with the cutting edges made from readily available ribbon steel. The mold insert and mold plates used to make the fabric-covered buckle of the present invention can be easily, inexpensively and quickly produced to accommodate quick changes of style.

The current method of heatsealing a fabric-covered belt buckle requires the use of a cardboard insert having a thin metal cover thereon. These inserts are relatively expensive with respect to the plastic insert which is used in the present invention. The present invention contemplates the elimination, from fabric-covered belt buckles, of the metal covered cardboard inserts.

Hand-turned and stitched belt buckles often require an extra process step, namely, painting the raw edge after cutting off the excess fabric. In view of the thin, tight seal produced on the outside edge of the fabric-covered buckles, produced according to the method disclosed herein, there is no need to perform the extra labor and associated cost for painting the raw, unfinished edge. Furthermore, the present invention provides a lip around the inside and outside edge of the buckle. This provides an attractive appearance and, again, gives the visual look of a hand-turned and stitched belt buckle, yet it is capable of being performed in relative minimum time, without associated labor costs. The present inventions produce visual pleasing belt buckles in huge quantities, all with uniformity of quality.

Thus, it is an object of the present invention to produce a fabric-covered buckle with a minimum of wasted fabric. This is accomplished by using a backing sheet for the rear of the fabric-covered buckle. It is also an object of the present invention to produce a hand-turned and stitched-looking belt buckle, in a minimum of time and in an efficient and inexpensive manner, on a mass scale with uniformity of appearance from belt buckle to belt buckle. It is an object of the present invention to eliminate the metal covered cardboard inserts of the fabric-covered belt buckles made according to the heatsealed method and to replace the same with easily available plastic inserts which can be adapted to accommodate quick style changes.

It is also an object of the present invention to produce a fabric-covered ornament or belt buckle having a lip extending around the aperture of the belt buckle and, in addition, extending around the outside edge of the belt buckle in much the same manner that hand-turned and stitched belt buckles now show lips.

It is also an object of the present invention to eliminate the bare metal on the rear of currently available die stamped male and female machine made buckles. Also, machine stamping requires large expenses for changing the shape of the belt buckle since new male and female parts are required and, in addition, requires a separate closing die for each shape. It is an object of the present invention to minimize the time and labor intensity of a belt buckle manufacturer of the hand-turned and stitched type belt buckle, which costs cannot be justified when inexpensive fabrics are being produced on a mass production level. It is an object of the present invention to do this without sacrificing quality of appearance and while maintaining uniformity of product quality from ornament to ornament or buckle to buckle.

It is also an object of the present invention to eliminate the cost and material losses of heatsealing fabric-covered belt buckles. Also, heatsealing precludes use of many fabrics. The present invention also has for its object the elimination of the step of painting the edge of fabric-covered belt buckles. This is accomplished by providing a fabric-covered belt buckle with a finished lip having an exterior edge which is extremely narrow in thickness.

It is also an object of the present invention to accomplish stylistic buckle design changes, in a minimum of time, while using readily available materials, i.e., wood, ribbon steel, and injection molding machinery.

SUMMARY OF THE INVENTION

The present invention relates to an apparatus for forming and manufacturing a fabric-covered article, preferably a belt buckle, in a minimum of time, with a minimum of wasted materials, while producing an aesthetically pleasing overall appearance in much the same manner as hand-turned and stitched fabric-covered buckles. Basically, the apparatus and method contemplate the use of a support board on which a backing sheet is placed. A buckle shaped insert, preferably plastic, is located on the backing sheet and a bead of glue is drawn along the inside edge of the aperture of the insert. Then, the covering fabric is overlaid over the buckle insert and the backing sheet and a mold insert, preferably, a block of wood corresponding in shape to the shape of the buckle aperture, is downwardly pressed over the aperture portion of the buckle insert. This causes the fabric to be initially adhered to the backing sheet along the bead of glue around the inside edge of the buckle. Then, while maintaining the pressure on the fabric, along the bead of glue, in the aperture of the belt buckle insert, the outside edges of the fabric are turned back slightly and a second bead of glue is drawn around the outside edge of the buckle insert. Then, a mold plate having an aperture of sufficient dimensions so that it can easily fit over the mold insert and the belt buckle insert is placed over the fabric and, again, pressure is provided to now force the fabric, along the second bead of glue, to adhere to the backing sheet. In this manner, the buckle insert is glued between and sandwiched by the fabric and the backing sheet. Then, to facilitate the glue drying procedure, a pressure providing mechanism is placed over the mold insert and the mold plate. The pressure providing mechanism has a pair of eyelets which receive hooks extending upwardly from the bottom-located support board. A series of springs, located between the top plate of the pressure providing mechanism and a pressure plate forces downwardly on the mold plate and mold insert and completes the gluing process of the fabric to the backing sheet with the buckle insert located therebetween. Vertical guides are secured to the sides of the pressure providing mechanism and insure that the pressure plate vertically reciprocates with respect to the top plate. After the glue drying process is accomplished, the buckle is then trimmed by inserting the fabric layer, upside down, i.e., by inverting the covered buckle and locating it in a channel of a trimming apparatus.

The trimming apparatus of the present invention is a trimming mechanism for removing the excess fabric and backing sheet from both the aperture of the covered belt buckle and around the exterior edge of the covered belt buckle. As mentioned, the fabric, with the buckle insert and backing sheet is located in a channel which extends upwardly above a support surface. Thus, the backing sheet is exposed. A backboard is placed on top of the backing sheet and the backboard, backing sheet, buckle insert and fabric (located in the channel) are downwardly reciprocated such that cutting edges pierce through fabric material and backing sheet to produce the finished edges of the belt buckle with all excess material trimmed away.

The method of manufacturing the belt buckle is also a part of the present invention as well as the method of trimming the belt buckle. These and other aspects of the present invention are more fully explained in the drawings and specification which form a part of the present invention.

DETAILED DESCRIPTION OF THE DRAWINGS AND

THE PREFERRED EMBODIMENT OF THE INVENTION

Figure 5:
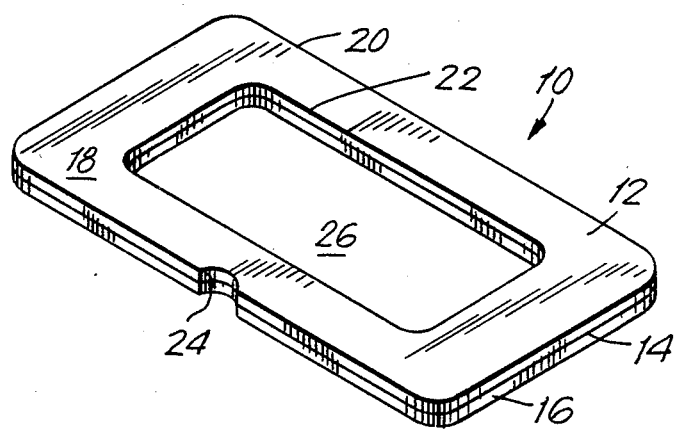
FIG. 5 is a perspective view of a finished, fabric-covered belt-buckle made according to the method of the present invention by use of the apparatus disclosed herein.

As best seen in FIG. 5, a fabric-covered article, preferably a belt buckle, is the final finished product manufactured according to the method of the invention by use of the apparatus disclosed herein. The fabric-covered belt buckle 10 consists of fabric 12 which, in the preferred embodiment, can be imitation leather, ostrich, or any other suitable material. A seam 14 separates the fabric 12 from the backing sheet 16 which, in the preferred embodiment, is a vinyl or plastic material but, if desired, the backing sheet 16 can be the same fabric material as fabric 12. The top surface 18 of the finished belt buckle 10 is glued, in a manner to be hereinafter more fully explained, to the backing sheet 16 with an insert, in the basic shape of the belt buckle, located or sandwiched therebetween. The insert provides and defines the shape and dimensions of the finished belt buckle 10. After trimming of the fabric-covered belt buckle, an exterior edge or lip 20 and an interior edge or lip 22 are defined, as well as notch 24, located in the exterior edge 20 of the buckle, and aperture or central opening 26, located along the inside seam of the belt buckle. The seam 14 is, after trimming, relatively thin in cross-section and smooth and, pursuant to the invention disclosed herein, the fabric 12 will not come apart from the backing sheet 16 but, rather, a permanently glued fabric-covered belt buckle 10 is provided. The notch 24 is primarily for the purposes of locating and holding the normally or conventionally provided belt finger which is inserted into the appropriate belt hole for sizing around a person.

Figure 1:
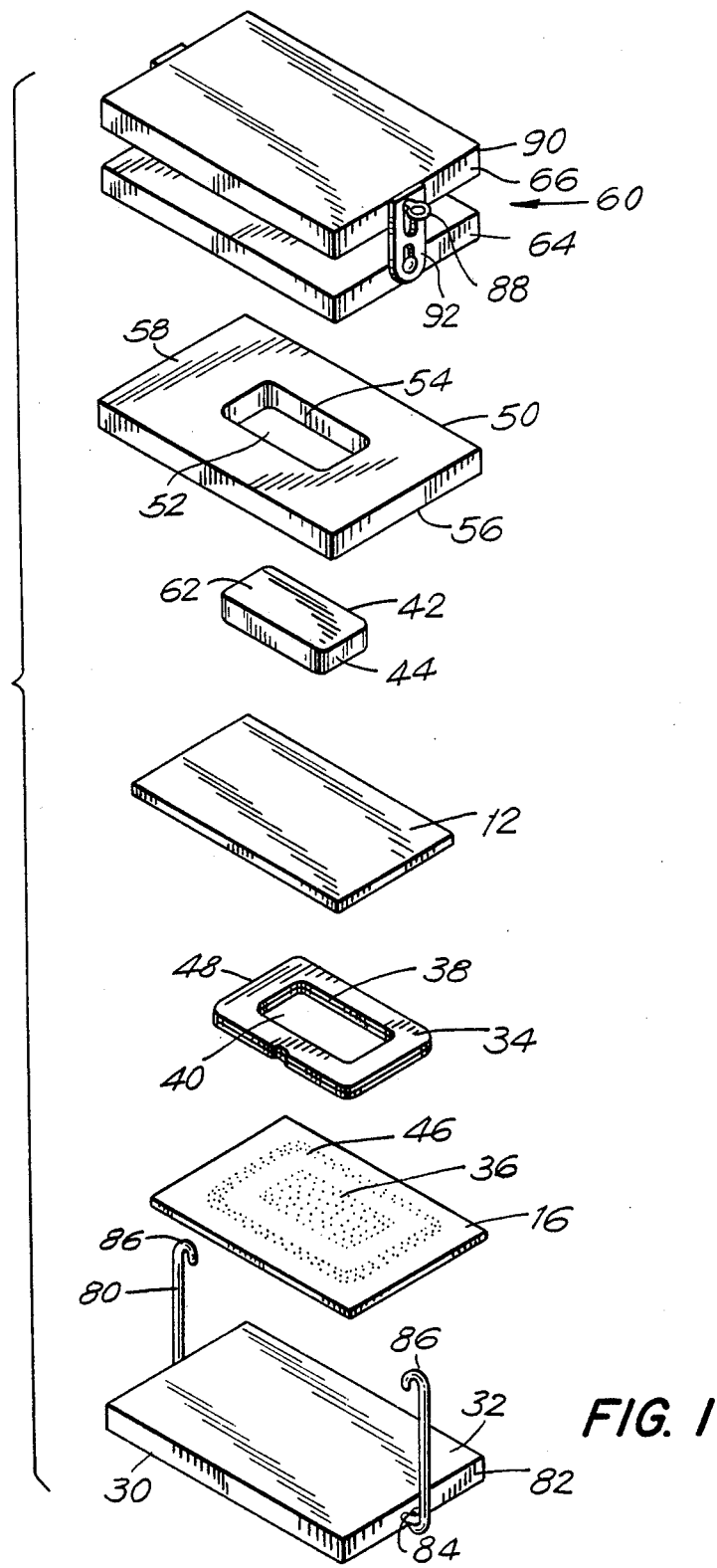
FIG. 1 is an exploded, perspective view of the apparatus used for making the fabric covered article (in its untrimmed state)
Figure 2:
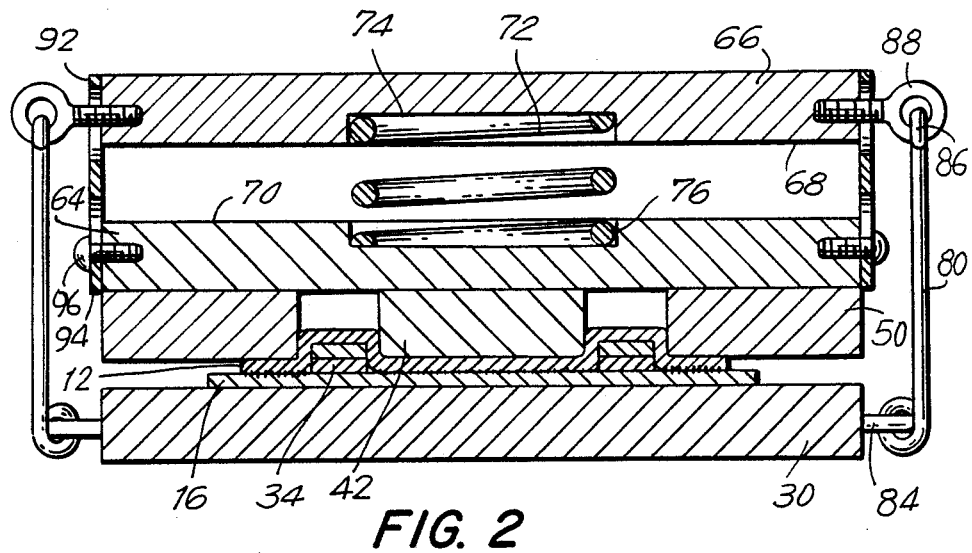
FIG. 2 is a cross-sectional view of the apparatus shown in FIG. 1, as assembled, and during the glue drying step.

As best seen in FIGS. 1 and 2, the apparatus for manufacturing the fabric-covered belt buckle 10 basically consists of a support board 30 which is preferably made of wood. The top surface 32 of support board 3 is the base on which the backing sheet 16 is placed during the manufacturing process. It will be appreciated that the backing sheet 16, prior to trimming, is ordinarily of greater length and width than the finished fabric-covered belt buckle 10. After the backing sheet 16 has been placed on the top surface 32 of the support board 30, an insert 34, corresponding substantially in shape and dimensions to the final dimensions of the fabric-covered belt buckle 10, is placed thereon. According to the preferred embodiment of the present invention, the insert 34 is a plastic insert but, it can be appreciated, that currently available composite inserts having a top layer of metal glued to cardboard can be used. It is an aspect of the present invention that the plastic insert 34 can be a substitute for the composite insert now available and, in this manner, significant cost savings can be achieved. After the insert 34 is located on the backing sheet 16, a bead of glue 36 is carefully manually run slightly inside of yet along the inside edge 38 of the insert 34, corresponding to the shape of aperture 40 of insert 34. Then, the fabric layer 12 which, again, it will be appreciated, in its untrimmed state is of larger length and width than the dimensions of the final product, is overlaid over the insert.

In order to push the fabric 12 through aperture 40 of the insert and to glue the underside of the fabric 12 to the backing sheet 16, a mold insert 42 of dimensions slightly less than the dimensions of aperture 40 is placed within the boundaries defined by the inside edge 38 of insert 34. In this manner, the bead of glue 36 causes the underside of the fabric 12 to adhere to the backing sheet 16. In order to accomplish this pressing of the mold insert 42 against the fabric 12, a foot press can be used. This machinery is conventionally available in the industry. Basically, the foot press, not forming a part of the present invention, consists of a foot pedal which, when depressed, causes a holding "finger" to move downwardly and provides downward pressure. If the support board 30 is located on the work support of the foot press, actuation of the foot pedal of the press presses the mold insert downwardly.

After the foot press holds the mold insert 42 downwardly such that it presses the fabric 12 against the backing sheet 16, with the insert 34 located therebetween, the bead of glue 36 will start to bond the fabric 12 to the backing sheet 16. As mentioned, the foot press causes the mold insert 42 to press downwardly against the support board 30. After a sufficient period of time elapses, ordinarily just a few seconds, the foot press pressure is maintained while a second bead of glue 46 is manually placed around yet slightly spaced from the exterior edge 48 of the insert 34. This is done by upturning the edges of the fabric 12. Then, the pressure on the foot press is released and a mold plate 50 is positioned such that the mold insert 42 is located within aperture 52 of the mold plate. Insert 34 is sandwiched between the fabric 12 and the backing sheet 16 between the interior edge 54 of mold plate 50 and the exterior edge 44 of mold insert 42. The bottom 56 of the mold plate 50 is, clearly, of greater width and length dimensions than the final product, i.e., the fabric-covered belt buckle 10 so that slight excess fabric 12 is glued to the backing sheet 16. It should also be appreciated that the mold insert 42 is the same thickness as the mold plate 50 such that when pressure is applied on top of the mold plate 50 by the foot press or other pressure providing means, it will press both the mold plate 50 and, in addition, the mold insert 42 uniformly downwardly, with the fabric layer 12, the insert 34, and the backing sheet 16 sandwiched between the mold plate, the mold insert and the top surface 32 of support board 30.

A pressure providing or compression mechanism 60 provides uniform downwardly directed pressure onto the top 58 of the mold plate 50 and to the top 62 of mold insert 42 to complete the gluing process. The compression mechanism 60 provides uniform pressure on the mold plate 50 and mold insert 42 so that the backing sheet 16 is glued to the fabric 12, with the insert 34 located therebetween, while all materials are supported on the top surface 32 of support board 30. The compression mechanism 60 consists of a pressure plate 64, preferably made from wood, and a top plate 66 also, preferably, made from wood. In the embodiment shown in FIG. 1, the dimensions of the pressure plate 64 and top plate 66 are equal to one another and equal to the dimensions of support board 30.

Located between the underside 68 of top plate 66 and the top surface 70 of pressure plate 64 is a helical spring 72 which provides the compressive force for the pressure plate, acting between the top plate 66 and the support board 30, in a manner which will be more fully described hereinafter. The helical spring 72 is, preferably, located in a pair of opposed recesses 74 and 76, centrally located in the underside 68 of top plate 66 and the top surface 70 of the pressure plate 64. Of course, it should be appreciated that a plurality of springs located between top plate 66 and pressure plate 64 can be used, in lieu of the single spring 72 shown in the preferred embodiment. These spring replacements would, of course, be located in corresponding pairs of recesses between top plate 66 and pressure plate 64 similar to that shown in FIG. 2.

Support board 30 is provided with a pair of upwardly extending hook elements 80 which are secured into the sides 82 of support board 30 by hook eyelets 84, screwed therein. The hook elements 80 are provided with hooking portions 86 which are adapted to be received and held within eyelets 88 screwed into the sides 90 of top plate 66. It will be appreciated that the length of the hook elements 80 is such that when the backing sheet 16, insert 34, fabric 12, mold insert 42, and mold plate 50 are held on the support board 30, and the pressure plate 64 with the top plate 66 is located on top of the mold insert 42 and the mold plate 50, the hooking portions 86 are received within and held by eyelets 88 such that the spring(s) 72 cause the pressure plate 64 to bear downwardly onto the mold insert 42 and the mold plate 50 to thereby compress the fabric 12 downwardly against the backing sheet 16. This causes the bead of glue 36 and second bead of glue 46 to adhere the fabric 12 to the backing sheet 16.

A mechanism is also provided for vertically guiding the pressure plate 64 with respect to the top plate 66, when the device is assembled to the support board 30. The guiding mechanism basically comprises a pair of metal guides 92, connected between the sides 90 of top plate 66 and the sides 94 of the pressure plate 64. The metal guides are secured to the plate by eyelets 88 and to the pressure plate 64 by simple wood screws 96. The metal guides 92 are provided with two oval shaped apertures 98 and 100 through which the wood screws 96 and the eyelets 88 pass. The oval shaped apertures 98 and 100 allow vertical reciprocation of the pressure plate with respect to the top plate when the device is assembled as shown in FIG. 2.

According to the present invention, when it is desired to manufacture a fabric-covered article and, preferably, a belt buckle in the form shown in FIG. 5, the operator first places the backing sheet 16 on the top surface 32 of support board 30. The buckle insert 34 is centrally positioned on the backing sheet 16 and a first bead of glue 36 is drawn along the inside edge 38 of the buckle insert 34. Then, the fabric 12 is overlaid over the buckle insert and backing sheet. The mold insert 42 is then manually located on top of the fabric 12 such that it is seated in the central aperture 40 of the buckle insert 34. The foot press mechanism is then actuated, preferably, by foot pressure and this causes a finger or holding mechanism of the foot press to cause downward pressure on the mold insert thereby causing fabric 12 to adhere to the backing sheet with the buckle insert located therebetween, along the line defined by the first bead of glue 36. With the pressure being maintained on the mold insert, the operator will then draw a second bead of glue 46 around the exterior of the buckle insert 34 on the backing sheet 16, by upwardly turning the fabric 12 as, the bead of glue is run around the outside edge 48 of the buckle insert 34. Then, the foot press is momentarily released such that the mold plate 50 is located on top of the fabric 12, with its central aperture 52 fitting over the mold insert 42, with the buckle insert 34, sandwiched between the backing sheet 16 and the fabric 12. Again, the foot press is actuated to create downward pressure between the mold insert 42 and mold plate 50 and the support board 30, such that the fabric 12 is caused to be adhered to the backing sheet 16 with the buckle insert 34 sandwiched therebetween. Subsequently, the foot press is released such that the foot press mechanism can be used for a second fabric covering operation utilizing a second support board, new backing sheet, a new buckle insert, another mold insert and mold plate. After the foot press is released, the pressure plate 64 is located directly above the mold insert and the mold plate with the top plate 66 located at the top. The hooking portions 86 are then positioned in the eyelets 88 of the top plate 66 which thereby causes uniform downward pressure on both the mold insert and the mold plate against the support board to thereby allow the adhesive to cure and to more completely bond the fabric 12 to the backing sheet 16 with the buckle insert 34 sandwiched between the two. This apparatus is then set aside until the adhesive is fully set and the trimming procedure can then be performed. While the first apparatus for covering a belt buckle is at rest during the curing time, the operator can, at the same time, start the manufacturing process for a second and third fabric covered belt buckle utilizing the same foot press but, for each belt buckle, a separate support board, mold insert, mold plate and pressure providing mechanism are required.

Figure 3:
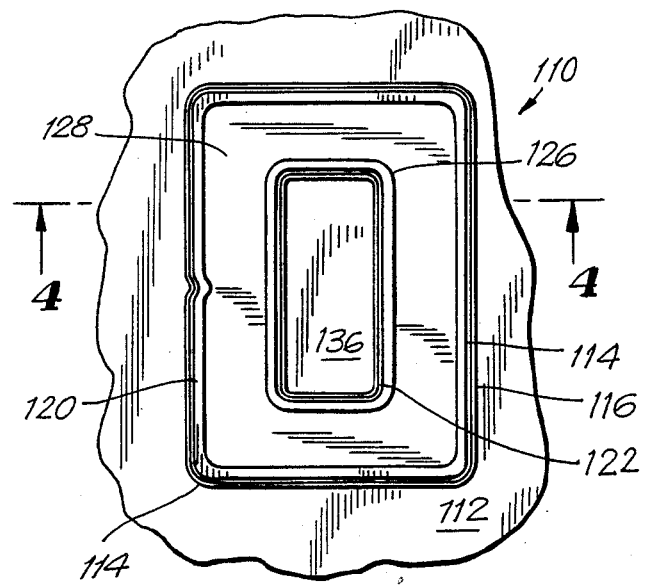
FIG. 3 is a partial, top plan view of the apparatus used for trimming the fabric-covered article.

After the belt buckles have had a sufficient period of time such that the fabric is glued to the backing sheets, it is now appropriate to trim the excess material from the outside edge of the product performed by the apparatus shown in FIGS. 1 and 2 and, in addition, it is now appropriate to trim the central aperture. More specifically, the central aperture 26 of the fabric covered belt buckle must be trimmed of excess fabric 12, excess glue, and excess backing sheet material 16 as well as the excess fabric extending around the exterior edge of the buckle. It is part of the present invention to trim both the central aperture 26 and the excess material located around the exterior edge of the belt buckle, at the same time, by utilizing the apparatus best shown in FIGS. 3 and 4.

The trimming mechanism 110, consists of a support surface 112, preferably, a block of wood. A cutting edge 114 is located in the support surface 112 and projects upwardly therefrom and defines an exterior cutting edge for the fabric-covered belt buckle. A razor-like edge 116 is located at the very top of the cutting edge 114 and will cut through the fabric, the excess glue and the backing sheet, as will be more fully explained hereinafter. Thus, it will be appreciated that the dimensions and shape of the razor-like 116 corresponds precisely to the final product dimensions and shape of the fabric-covered belt buckle 10, including a lip, if desired.

Figure 4:
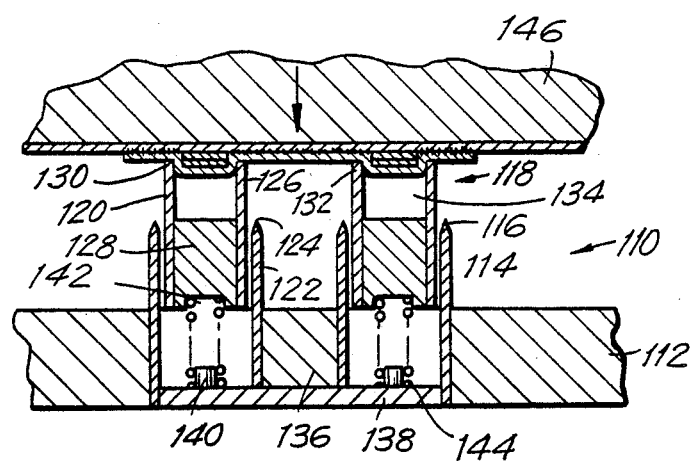
FIG. 4 is a cross-sectional view taken along lines 4—4 of FIG. 3 and, in addition, showing the fabric-covered article located in the trimming apparatus prior to trimming.

The trimming mechanism !10 further includes an untrimmed article-locating and positioning mechanism 118 which basically comprises a telescopically received, upwardly extending metal-like ridge 120. This, too, is in the basic shape and dimensions as cutting edge 114 yet slightly smaller so as to be able to reciprocate vertically within the cutting edge. The actual dimensions of the ridge 120 are slightly less than the dimensions of razor-like edge 116 which, as previously mentioned, correspond to the actual dimensions of the ultimate desired product. However, the dimensions of the ridge 120 are sufficient to support the fabric covered article when it is inverted and placed within the channel defined by ridge 120, as best shown in FIG. 4. Basically, the dimensions of the ridge equal the overall width of insert 34 plus the thickness of fabric 12. In the preferred embodiment of the present invention, the fabric covered article is a belt buckle and, therefore, a central aperture 26 (see FIG. 5) must be cut and trimmed and, for this reason, an inside cutting edge 122 having a razor edge 124 corresponds to the dimensions and shape of the desired aperture 26. Correspondingly, the positioning mechanism, in the preferred embodiment, comprises an inside upwardly extending ridge 126 which, again, is telescopically received within the confines defined by inside cutting edge 122. A wood block 128 is glued or otherwise secured between ridge 120 and inside ridge 126 so that the two ridges 120 and 126 will reciprocate together as a unit. Between them they define a channel for receipt of the fabric covered article made from the apparatus described and shown in FIGS. 1 and 2. The top surface 130 of ridge 120 and top surface 132 of inside ridge 126 are flat and relatively co-planar. Top surface 130 provides a support, inside of the exterior edge 20 of the finished fabric-covered belt buckle 10, while top surface 132 provides a support for the interior edge 22 of fabric-covered belt buckle 10. It will be seen from FIG. 4 that the insert 34 and the fabric 12 are received within the channel 134 defined between ridge 120 and inside ridge 126 of positioning mechanism 118. A wood block 136 is located between the inside cutting edge 122, to maintain the same in position, and is supported along with inside cutting edge 122 on a thin wood block 138, which extends between the sides of continuous cutting edge 114. It will be appreciated that cutting edge 114, inside cutting edge 122, ridge 120 and inside ridge 126 are, continuous, i.e., closed loops corresponding to the shape of the fabric-covered belt buckle 10.

Wood block 138, as stated, supports the inside cutting edge 122 and, in addition, provides support for pegs 140 which are centrally positioned with respect to cutting edge 114 and inside cutting edge 122. It is the preferred embodiment for a plurality of pegs 140 to extend around the loop defined by the cutting edges. For each peg 140, a corresponding recess 142 is located directly thereabove in the wood block 128, secured between ridge 120 and inside ridge 126. Springs 144 are located between corresponding recesses 142 and pegs 140 and are held in position by the pegs 140. The springs 144 are, preferably, coiled and are of sufficient length such that top surfaces 130 and 132 of ridge 120 and inside ridge 126, respectively, extend above the razor edge 116 and razor edge 124 of cutting edge 114 and inside cutting edge 122, respectively. The overall height of ridge 120 and inside ridge 126 is less however than the height, in elevation, of razor edges 116 and 124 which, as shown in FIG. 4, are co-planar. This, as will be explained hereinafter, allows, upon reciprocation downwardly, of the positioning mechanism 118, the cutting edges 114 and inside cutting edge 122 to extend up and cut through the fabric 12 and the backing sheet 16 to thereby trim away the excess material and provide the finished fabric-covered belt buckle 10. A backboard 146, after the fabric-covered belt buckle is inverted and positioned between the ridge 120 and inside ridge 126, is placed over the rear surface of backing sheet 16 to facilitate the cutting and trimming process.

To summarize, after the insert 34 has been glued or sandwiched between the backing sheet 16 and the fabric 12, by the bead of glue 36 and the second bead of glue 46, and once an appropriate period of time has elapsed to finish the gluing process, the fabric covered article is removed from the mechanism shown in FIG. 2 and the article is inverted such that the insert 34, covered by the fabric 12, is positioned within the channel 134, defined between ridge 120 and inside ridge 126. Then, the backboard 146 is placed over the rear surface of the backing sheet 16. The trimming device and specifically the support surface 112, has, of course, previously been located on the foot press mechanism and, with the backboard in place, the foot pedal of the foot press is actuated such that downward pressure is created on the backboard 146 against the force of springs 144. This downward pressure causes the ridge 120 and inside ridge 126 to telescope downwardly within the confines defined by cutting edge 114 and inside cutting edge 122 and, since the height of the ridges is, in elevation, less than the upwardly extending razor edges 116 and 124 of the cutting edges 114 and inside cutting edge 122, respectively, the razor edges will pierce through the fabric 12, the backing sheet 16 and project, slightly, into the backboard 146 when the trimming and cutting is completed. Then, the foot pedal of the foot press is deactivated and the springs 144 cause the positioning mechanism 118 to reciprocate upwardly, telescoping out of the confines defined by the cutting edge 114 and the inside cutting edge 122. The excess material is thus trimmed from around the exterior edge 20 of the finished buckle and, in addition, from the central aperture 26, along the interior edge 22 of the fabric-covered belt buckle 10. It should be easily understood that, after trimming, as just described, the width of the lip of fabric surrounding the insert is substantially equal in width to the ridges 120 and 126, i.e. the fabric lip is the same as the distance across the top surfaces 130 and 132. This can be seen from a review of FIG. 4. Thus, a finished belt buckle is provided.

Figure 6:
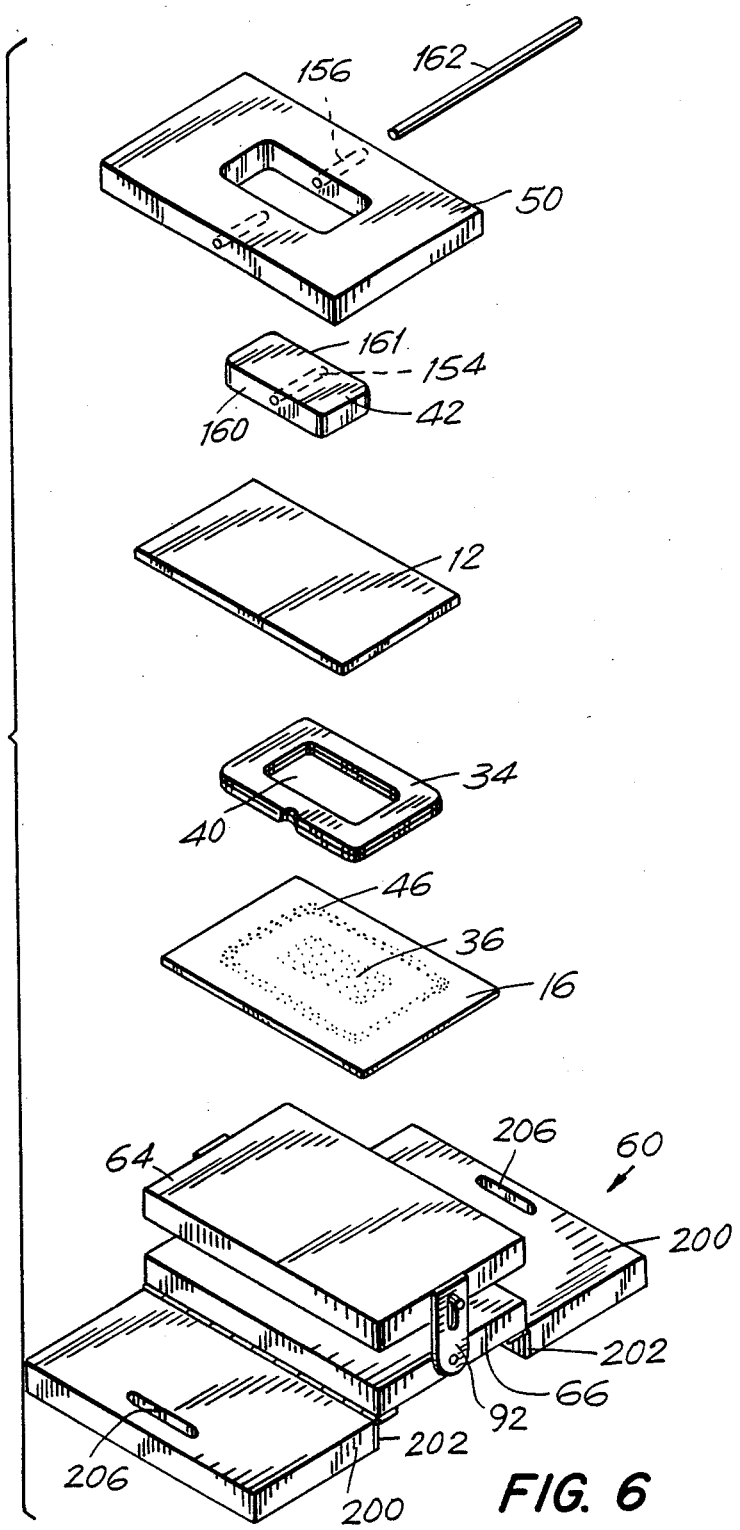
FIG. 6 is an exploded perspective view of an alternate embodiment of the apparatus to that shown in FIGS. 1 and 2.
Figure 7:
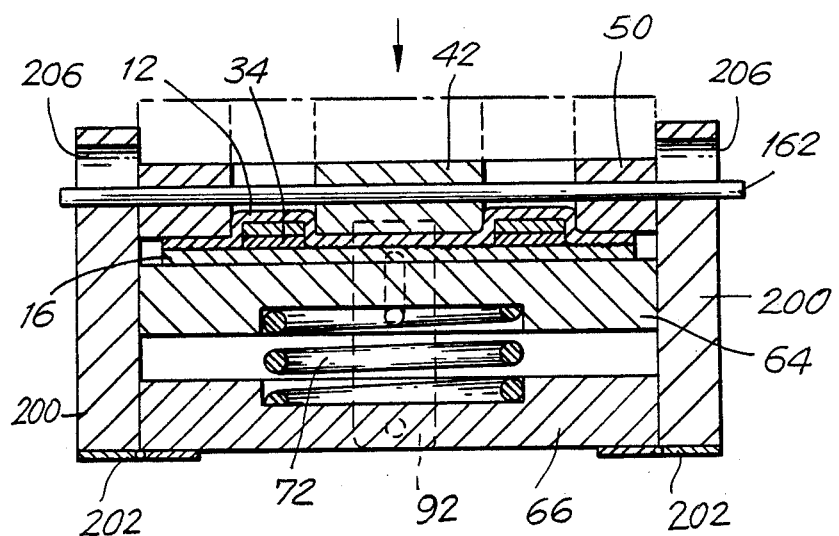
FIG. 7 is a cross-sectional view of the embodiment shown in FIG. 6 with the elements assembled for gluing the fabric to the backing sheet.

An alternate embodiment of the present invention, is best seen in FIGS. 6 and 7. Basically here, the compression mechanism 60 is inverted in principle, such that the top plate 66 is located on the work surface of the footpress with the bottom of pressure plate 64 being the support surface on which the backing sheet 16 is originally laid. This embodiment not only inverts the position of the compression member but also includes side block members 200 which are connected by hinges 202 to the edges of the bottom of the top plate 66. An oval shaped hole or aperture 206 is provided through a top portion of the side block members 200. In all other respects, however, the compression mechanism 60, comprising the pressure plate 64 and the top plate 66 (now located beneath the pressure plate), as well as the springs, are the same as the embodiment illustrated and described with respect to FIGS. 1 and 2.

Once the backing sheet 16 is placed on the surface of the pressure plate 64, the first bead of glue 36 and insert 34 can be centrally located on the backing sheet 16. Alternatively, as mentioned, it is also contemplated that a broad brushing of glue be placed on the backing sheet 16 which would be wider and extend across both sides of insert 34. This brushing of glue can be quickly accomplished and eliminates the separate placement of the second bead of glue, as previously described. The brushing of glue also facilitates the actual gluing of the insert 34 to the backing sheet 16 which provides a more stable finished fabric-covered product. After the glue is placed on the backing sheet, the fabric 12 is overlaid over insert 34. In one method of manufacturing a fabric-covered belt buckle, the mold insert 42 is placed and located within the central opening or confines of the insert 34 with the fabric 12 overlying the insert 34, and the footpress is depressed. This is in much the same manner as previously described. In an alternate method of manufacture, however, where the glue is brushed on rather than first and second beads being drawn around the edges of the insert 34, the mold insert 208 and the mold plate can simultaneously be positioned and located. In yet another alternate embodiment of the present invention, the mold plate 50 can comprise a ring-like member 150 (not shown) which has a central aperture 152 corresponding in shape to the aperture 52 of mold plate 50. The use of ring-like member 150 in lieu of the wider and longer mold plate 50 enables the use of a block of wood of smaller dimensions. Basically, the ring-like member is identical to the mold plate except the corners and excess wood material are shaved or cut off. This is because it really is not necessary for the mold plate to fully extend the length and width of the support board or, in the present discussed embodiment, the full length and width of the pressure plate 64.

It will also be appreciated that in this alternate embodiment of providing pressure between the mold insert 42, the mold plate 50 (or ring-like member 150) and the pressure plate 64, for bonding the fabric 12 to the backing sheet 16, (with the insert 34 located therebetween) the mold insert is provided with a longitudinally extending channel or passageway 154. It extends from one side 160 of the mold insert to the other side 161. Similarly, the mold plate 50 (or ring-like member 150) is provided with a longitudinally extending channel or passageway 156, which extends through both of its sides and is coaxial, when mold insert 42 and mold plate 50 are placed over the fabric, with channel or passageway 154 of mold insert 42.

As mentioned, a pair of side blocks 200 laterally extend and are connected by hinges 202 to the side edges of the bottom of top plate 66. When the side blocks are rotated to extend vertically, a rod or pin 162 can be pushed through the first aperture 206 of a first side block 200, then through the channel 156 of the mold plate 50, through the channel 154 of the mold insert 42, then through the other half of the channel 156 of the mold plate 50 and then through the second aperture 206 of the second side block 200. The height of the top surface of the aperture 206 of the side blocks 200 is such that, when assembled, as just described, the mold insert 42 and ring-like member 150 or mold plate 50 bear down against the force of the spring or springs located between top plate 66 and pressure plate 64 to thereby press the fabric towards the backing sheet so as to glue the fabric 12 to the backing sheet 16 with the insert 34 sandwiched therebetween. Thus, after the initial foot press pressure is placed on the mold insert 42, and the ring-like member 150 or mold plate so located, the side blocks 200 are rotated to extend upwardly and pin 162 is caused to pass through aperture 206, through first half of channel or passageway 156, through passageway 154, through the other half of channel or passageway 156 and then through the other aperture 206 of the second side block 200. It will be appreciated, therefore, that the pin 162 forces the mold plate 50 and mold insert 42 against the pressure of the springs between the pressure plate 64 and top plate 66. This causes the fabric 12 to press down against and adhere to backing sheet 16. The trimming step of the fabric-covered article proceeds in the same way as previously discussed.

In yet another alternate embodiment of the present invention, the channel or passageway 156 of the mold insert 42 and ring like member 150 o mold plate 50 can be eliminated and the thickness of the mold insert 42 and/or ring-like member 150 or mold plate 50 is such that the rod 162 presses directly on the top of the mold plate and/or mold insert, when inserted through apertures 206. In this manner the pin or rod 162 bears upon the upper surface of the mold plate and/or mold insert. This then, eliminates threading of the rod 162 through the channels of the ring-like member or mold plate 162 and/or the mold insert.

In Yet another alternate embodiment of the present invention, it is contemplated that instead of using either beads of fluid-like glue or even a brushing of glue, heat sensitive glue can be used. In this embodiment and method of manufacture, the backing sheet 16 is laid down on a hot support plate, quite similar to a heated iron flat plate. Then a suitably dimensioned piece of heat sensitive glue (which is solid in its non-heated state) is manually placed and centrally located on backing sheet 16. The heat of the iron plate warms up the backing sheet and, in addition, warms up the glue so that it melts and is activated. Then, the insert 34 is placed on the glue and the method proceeds as previously described. In this embodiment, however, the heat applied to the backing sheet, glue and fabric facilitates the moldability and flexibility of the fabric and the backing sheet 16, as well as activating the glue sheet. The heat applied to the backing sheet and fabric, however, can sometimes result in difficulty of the step of gluing the fabric around the exterior edge of the insert and, for this reason, it is wise to put the article aside for temporary cooling, after gluing the inside edge, i.e., prior to use of the mold plate or the ring-like member for gluing of the fabric to the backing sheet around the exterior edge of the insert. In all other respects, however, this method proceeds as previously described.

It will be appreciated that the embodiment shown herein is the preferred embodiment of the present invention, as contemplated by the inventor but that the invention can, of course, take a variety of configurations without departing from the teachings of the invention; the scope of the invention to be determined by the scope of the claims and their legal equivalents.

I claim:

1. A mechanism for trimming excess material from a fabric-covered belt buckle or similar article having a three dimensional insert between layers of fabric comprising:
   (a) a substantially flat block having a flat working surface and an upwardly extending cutting edge substantially corresponding in size and shape to the size and shape of the trimmed fabric-covered belt buckle or article;
   (b) a positioning means defined as a ridge substantially conforming in size and shape to the edges defined by said insert, telescopically housed within the interior of said cutting edge and vertically reciprocal therein, said positioning means being spring-biased such that, in its unloaded state, the top edge of said ridge extends above said cutting edge, said ridge of said positioning means providing a positive locating and alignment mechanism for said fabric covered insert with respect to said cutting edge prior to trimming;
   (c) a top cutting backboard overlying said ridge and said cutting edge; and,
   (d) said positioning means having an overall height less than the height of said cutting edge such that downward pressure on said positioning means transmitted through said cutting backboard causes said top edge of said ridge to retract beneath said top edge of said cutting edge such that said cutting edge contacts said top cutting backboard to effectuate trimming of said excess material.

2. A mechanism as claimed in claim 1, wherein two continuous cutting edges are provided and said positioning means comprise two ridges parallel to said cutting edges and confined between said cutting edges.

3. A mechanism as claimed in claim 1, wherein the width of the top surface of said ridge of said positioning means defines the width of a lip extending around said fabric-covered belt buckle or article.

* * * * *